United States Patent [19]

Marks

[11] 4,206,396

[45] Jun. 3, 1980

[54] CHARGED AEROSOL GENERATOR WITH UNI-ELECTRODE SOURCE

[76] Inventor: Alvin M. Marks, 166-35 9th Ave., Whitestone, N.Y. 11357

[21] Appl. No.: 828,414

[22] Filed: Aug. 29, 1977

[51] Int. Cl.² .............................................. H02N 1/00
[52] U.S. Cl. .................... 322/2 A; 290/44; 290/55; 310/309
[58] Field of Search ............... 290/44, 55; 310/10, 310/308, 309, 11; 322/2 A

[56] References Cited

U.S. PATENT DOCUMENTS

| | | | |
|---|---|---|---|
| 3,518,461 | 6/1970 | Marks | 310/10 |
| 4,146,800 | 3/1979 | Gregory et al. | 290/44 |

OTHER PUBLICATIONS

Minardi and Lawson, Jan. 1975, 2nd U.S. Nat. Con. on Wind Energy Research.

*Primary Examiner*—J. V. Truhe
*Assistant Examiner*—Morris Ginsburg

[57] ABSTRACT

This invention relates to novel charged aerosol sources for diverse applications in Heat/Electric Power Generation, weather modification, airport fog clearance, dispersed chemical reactions, and other uses; and in particular, to a Wind/Electric Power Generator deriving electric power from wind power directly without moving mechanical parts through the medium of charged water droplets introduced into the airstream from a charging electrode, the charged droplets eventually discharging to ground, the electrical load being connected between the charging electrode and ground to complete the circuit. The wind/electric power is converted by an isobaric electrothermodynamic process occurring in the space charge field produced by the charged droplets, which are efficiently produced by novel charging devices on the charging electrode. The Wind/Electric Power Generator can be fabricated to extend across large areas of windstream to generate large electric power output at high voltage, and means are described for its conversion to standard 60 Hz, 110 V power.

29 Claims, 27 Drawing Figures

ELECTROJET METHOD

CONDENSATION METHOD

WIND/ELECTRIC POWER GENERATOR USING
MINIATURE FLASH BOILER STEAM JET CHARGED
AEROSOL SOURCE WITH CONTACT CHARGING

FIG. 19   WIND/ELECTRIC POWER GENERATOR USING MINIATURE FLASH BOILER STEAM JET CHARGED AEROSOL SOURCE

FIG. 20

CHARGED AEROSOL GENERATOR WITH UNI-ELECTRODE SOURCE

This invention relates to novel charged aerosol sources for diverse applications in heat/electric power generation, weather modification, airport fog clearance, dispersed chemical reactions, and other uses; and, in particular to a Charged Aerosol Wind/Electric Power Generator.

The devices according to this invention have the advantages of increased efficiency, simplified construction, and decreased cost.

Charged aerosol electric power generators have been described in my previous United States Patents[1].

It is an object of this invention to provide droplet emitters to produce about 1 μA for a power input of 4 mW or less; that is, with a ratio of current output/energy input >250 μA/watt. Such emitters are particularly useful for power transduction.

It is a further object of this invention to provide a simplified electrical circuit for a charged aerosol power converter.

A BRIEF DESCRIPTION OF THE FIGURES

Figure 7:
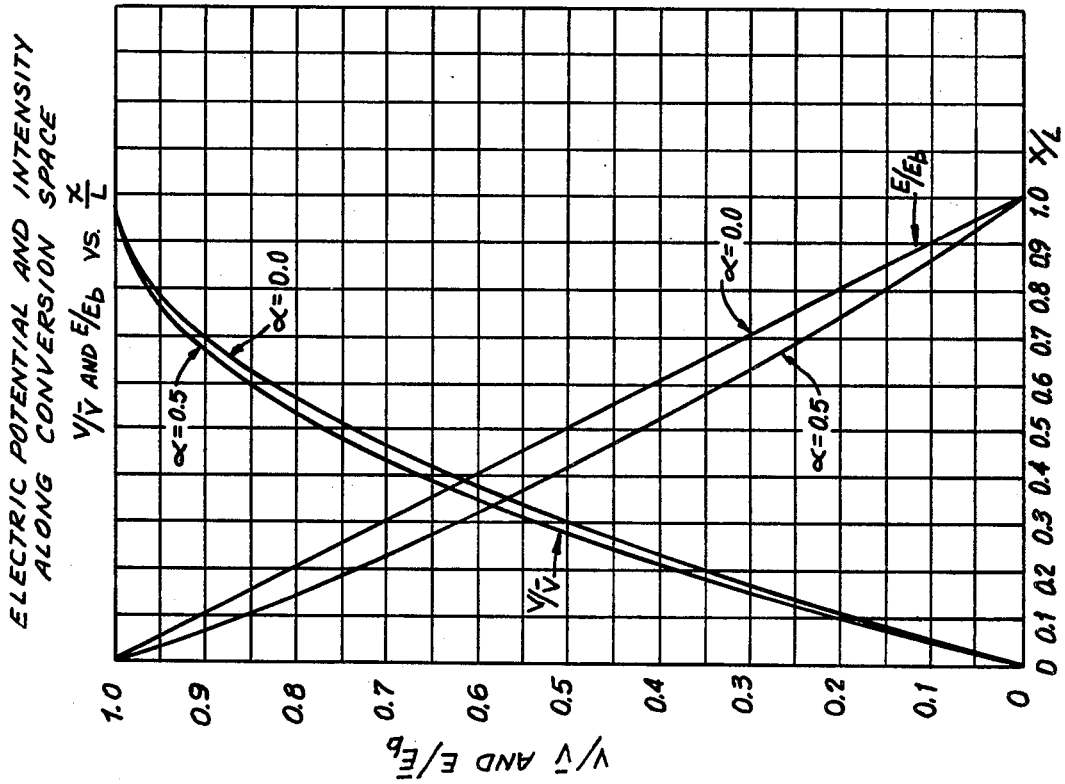

FIG. 7 graphically shows electric potential and intensity along a conversion space.

Figure 8:
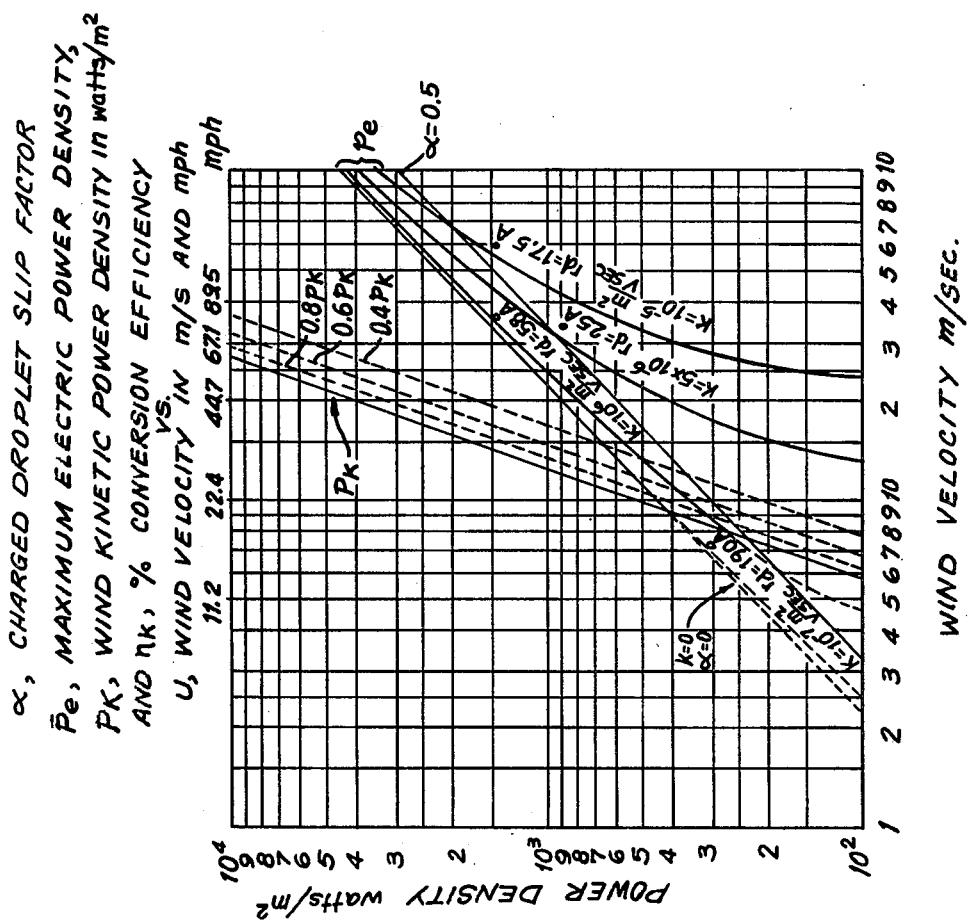

FIG. 8 shows electric power density, wind kinetic power density, and conversion efficency versus wind velocity.

Figure 9:
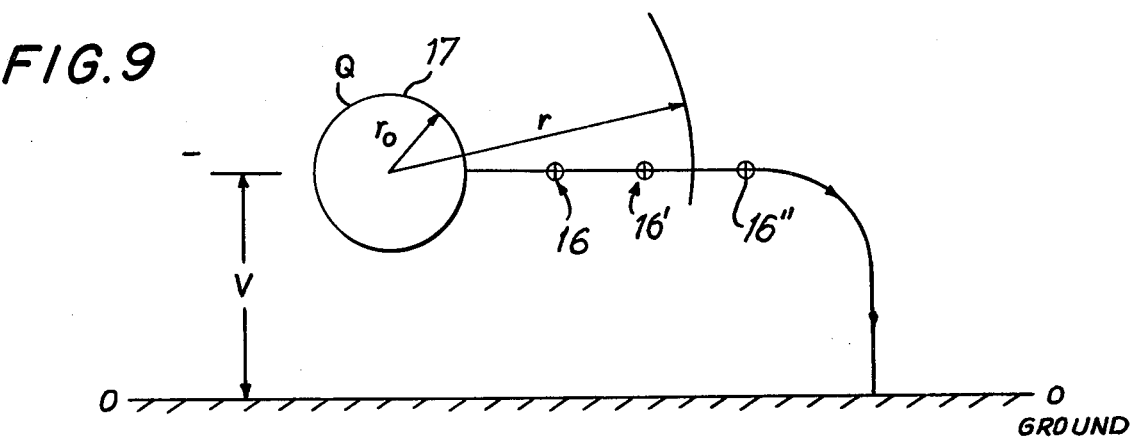

FIG. 9 shows diagrammatically the charging of a sphere according to electrical physics.

Figure 10:
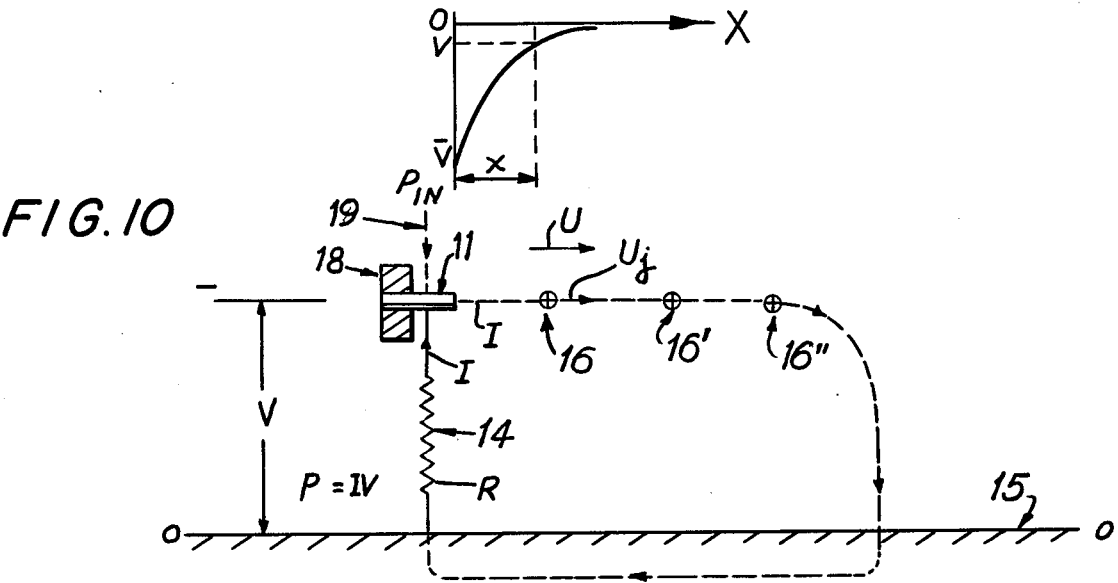

FIG. 10 shows a generalized diagram of a single electrode charged aerosol generator with electrical and/or mechanical input power to actuate the emitter source. The electric potential field due to space charge is also shown.

Figure 11:
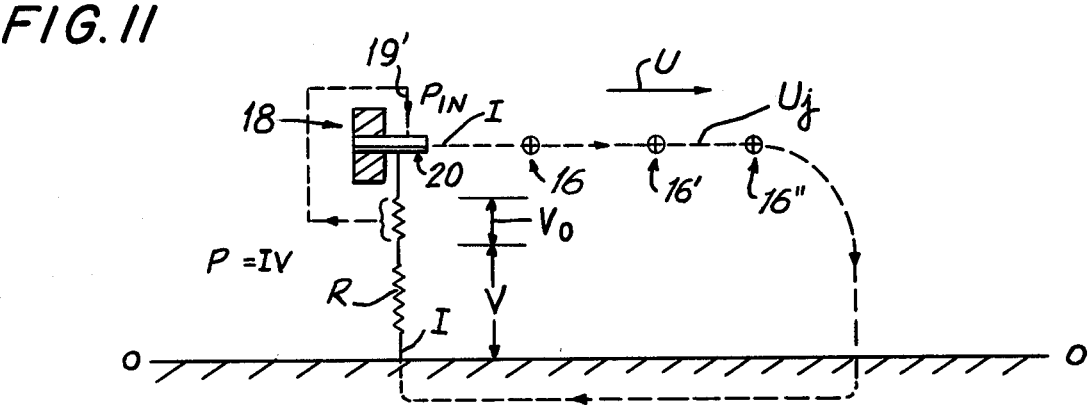

FIG. 11 is the same as FIG. 10, showing a portion of the generated electrical power used to actuate the emitter source.

Figure 12:
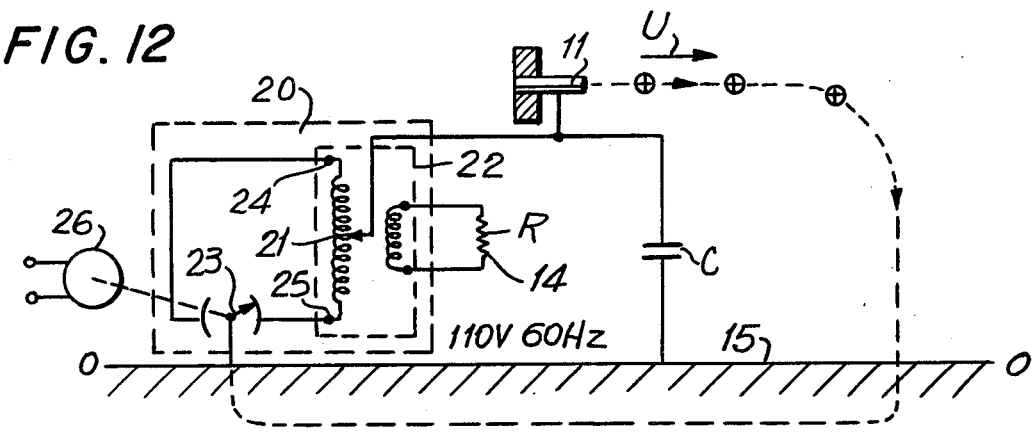

FIG. 12 shows a single electrode charged aerosol generator connected to produce a stepdown AC output.

Figure 13:
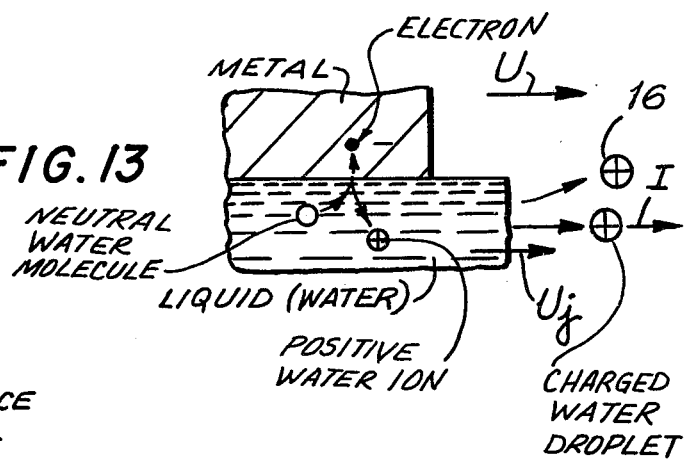

FIG. 13 shows a detail of a portion of a liquid jet charged by contact with the metal.

Figure 14:
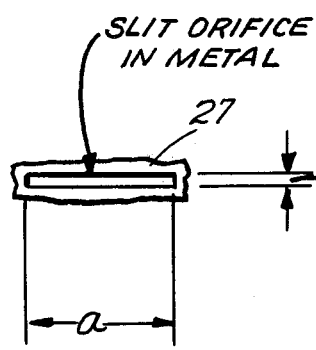

FIG. 14 shows the generalized dimensions of a slit orifice.

Figure 15:
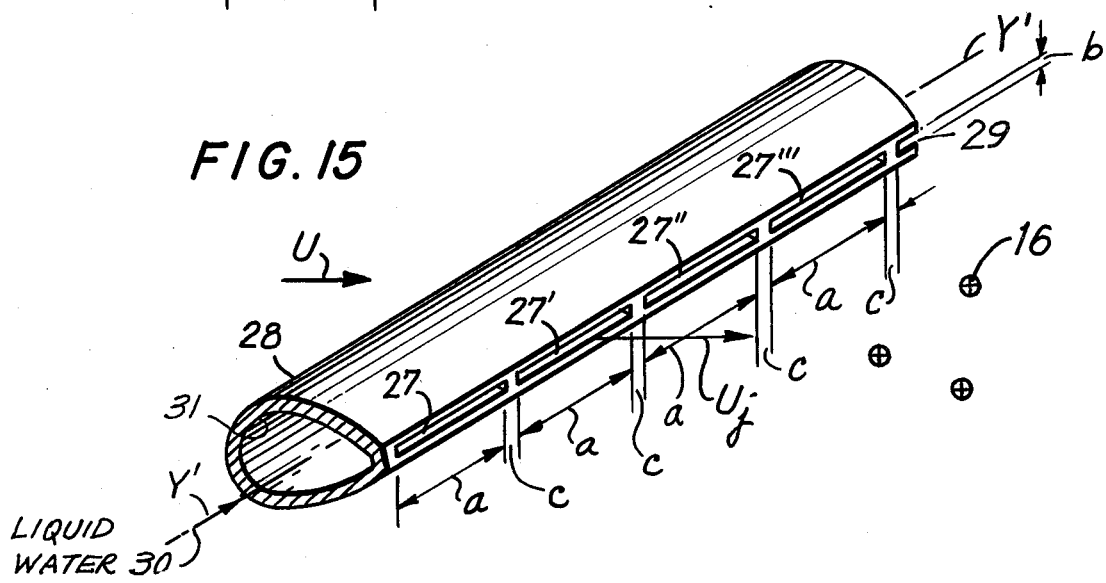

FIG. 15 shows a charged aerosol microjet emitter comprising an array of slit orifices.

Figure 16:
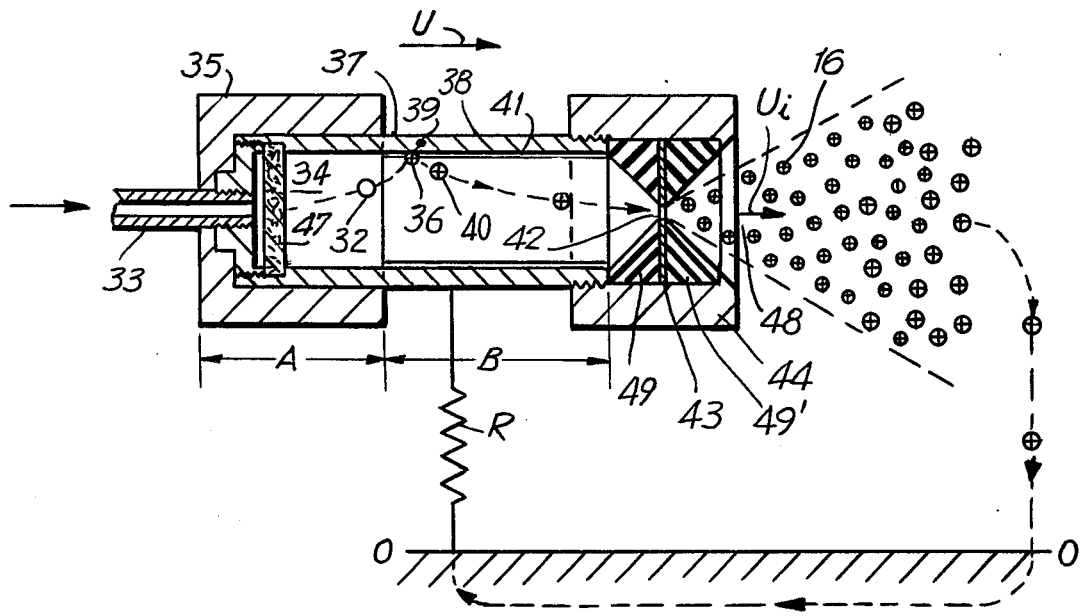

FIG. 16 shows a microjet emitter in a single electrode electric power generator, using steam/metal contact charging.

Figure 17:
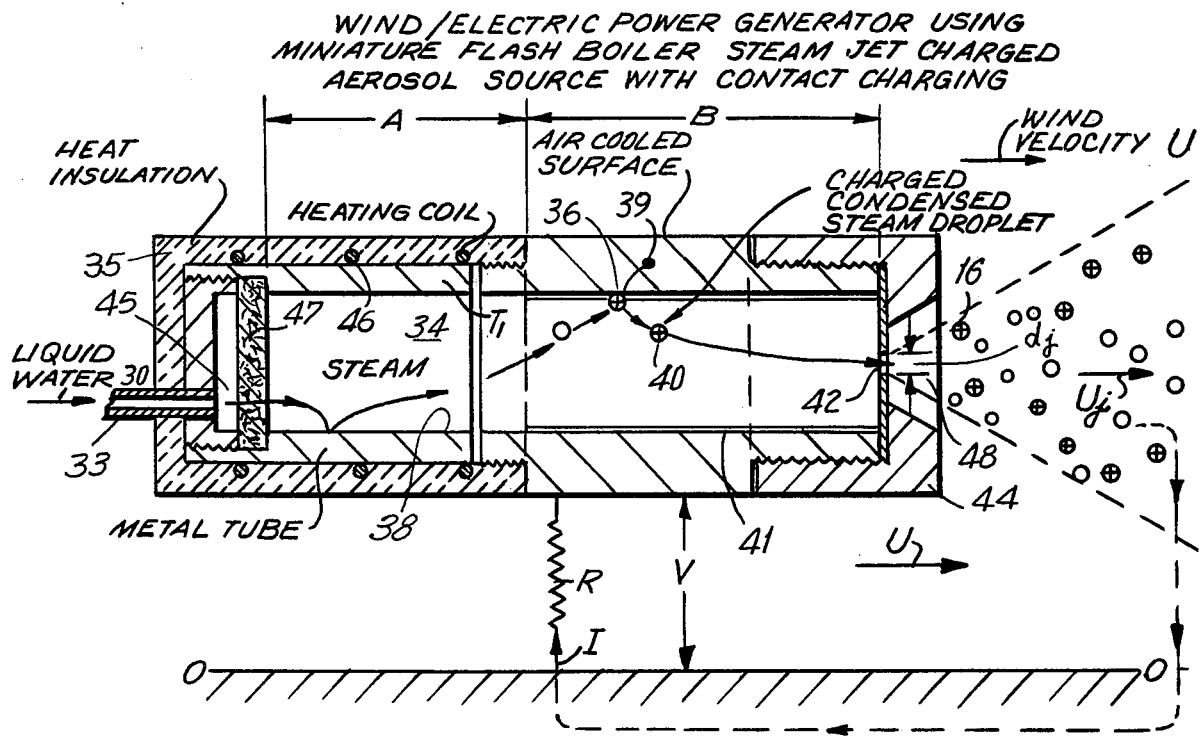

FIG. 17 shows a microjet emitter using steam/metal charging with a miniature flash boiler as an internal steam source.

Figure 18:
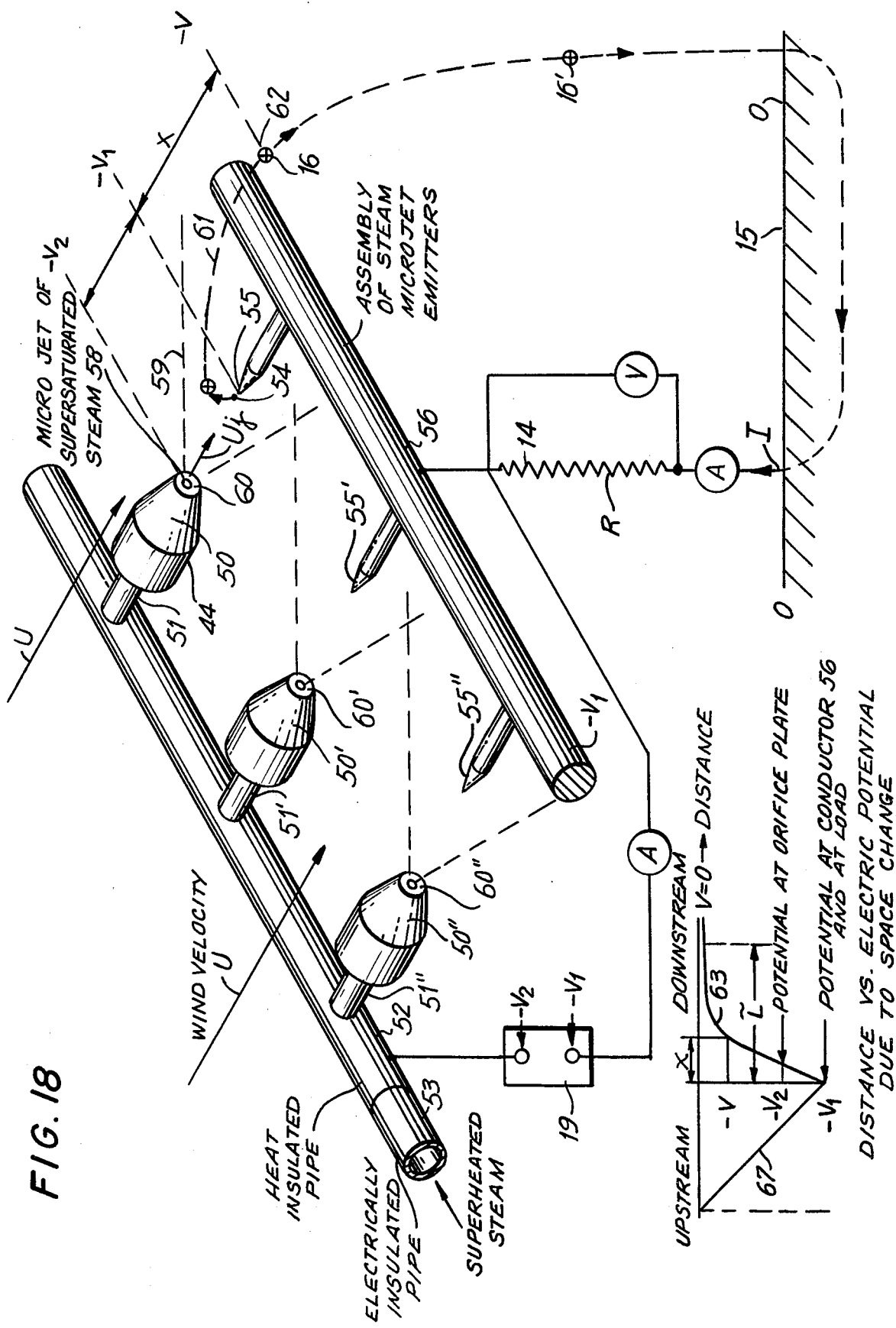

FIG. 18 shows a wind/electric power generator with an external steam supply comprising an array of microjet emitters with condensation charging, point ion sources, and floating electric power supply to provide the ions.

FIG. 19 shows a wind/electric power generator with a microjet, condensation charging, an internal point ion emitter, and a miniature flash boiler as an internal steam source.

FIG. 20 shows an assembled microelectrojet connected with a water source and compressed air source.

Figure 21:
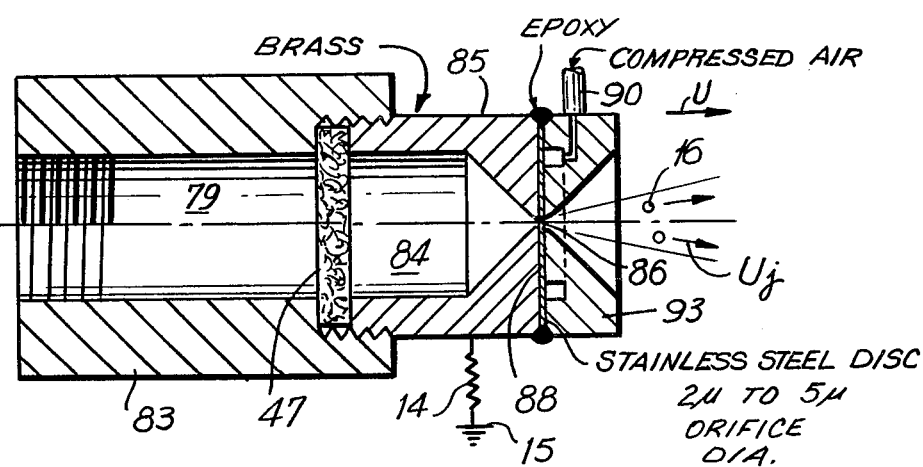

FIG. 21 shows a section through a microelectrojet emitter shown in FIG. 20.

Figure 22:
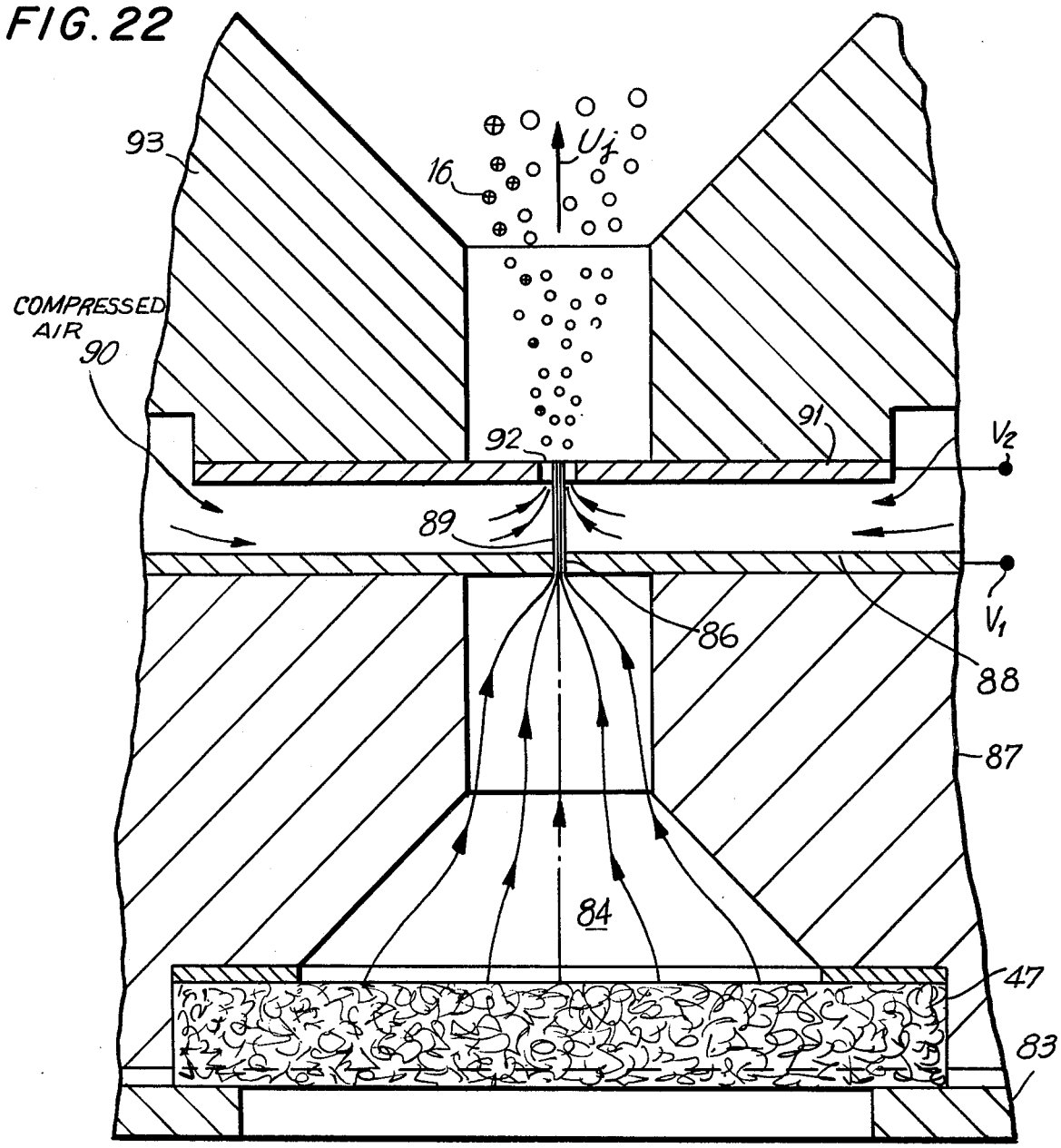

FIG. 22 shows a magnified cross sectional view of a microelectrojet source of charged water droplets.

Figure 23:
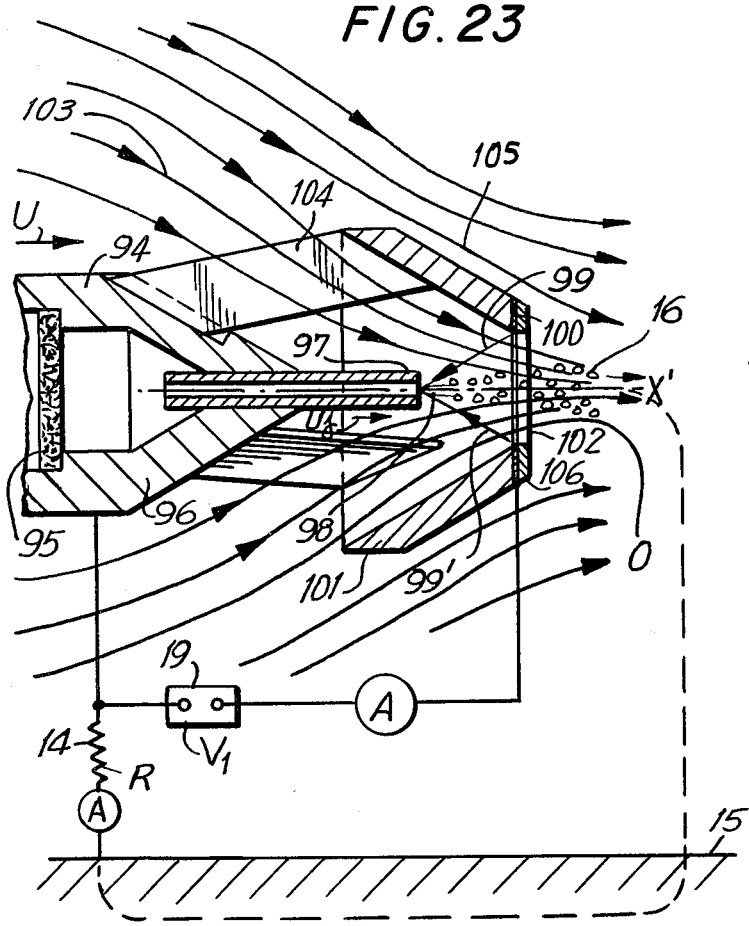

FIG. 23 shows a cross section of a free air microjet and exciter electrode for producing charged water droplets by induction of a water jet.

Figure 24:
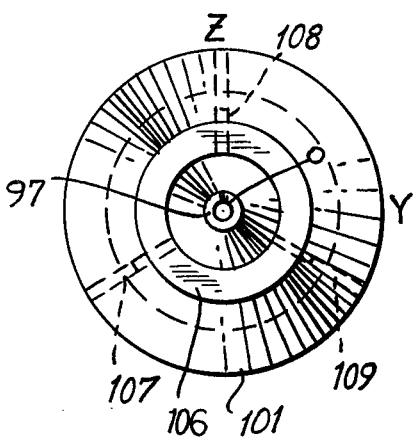

FIG. 24 shows a front plan view of the free air electrojet of FIG. 23.

Figure 25:
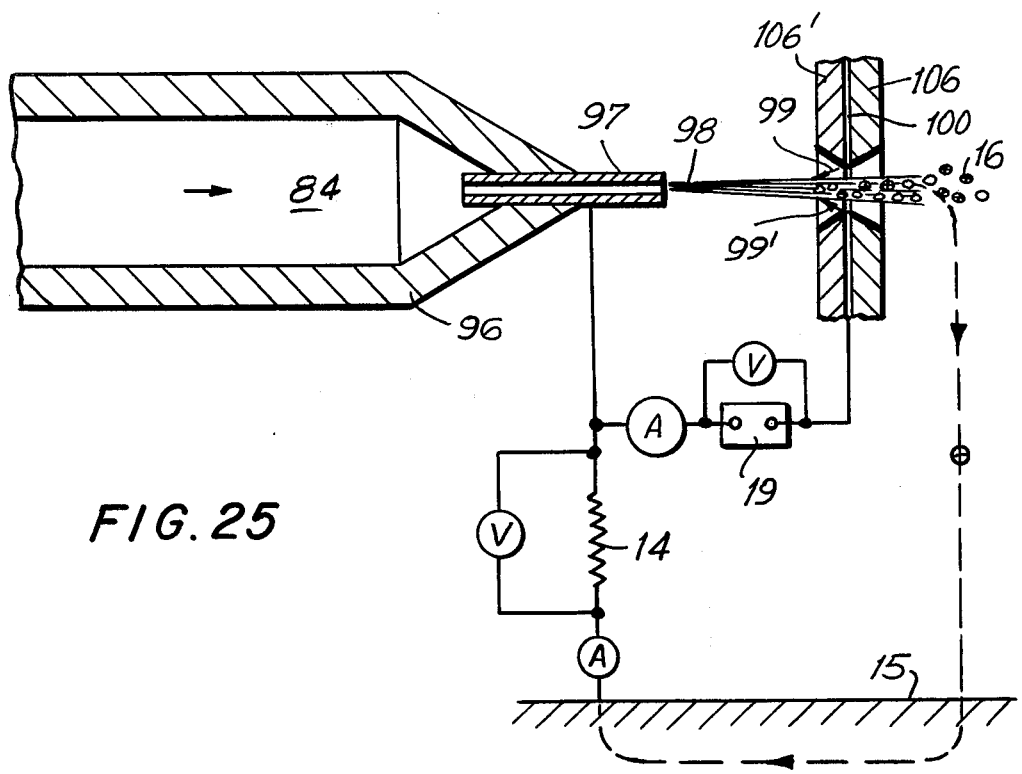

FIG. 25 shows a cross section of a microjet and exciter electrode for producing charged water droplets by induction of a water jet.

Figure 26:
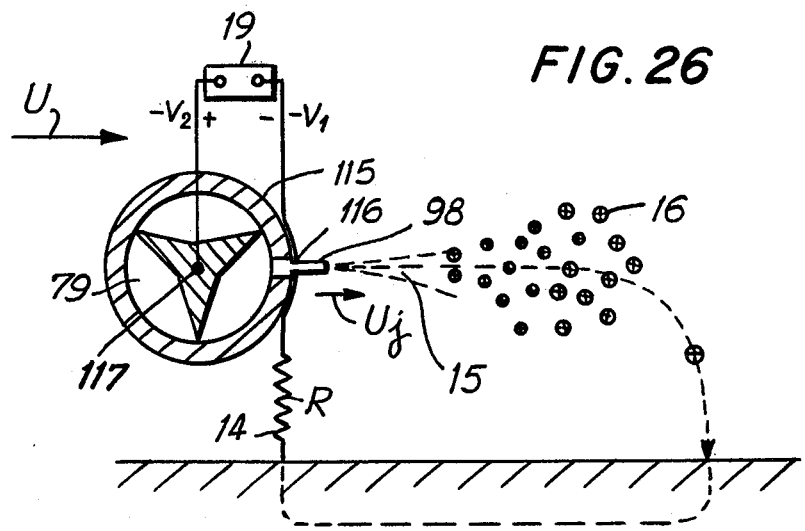

FIG. 26 shows a section of a microjet with an internal exciter electrode.

Figure 27:
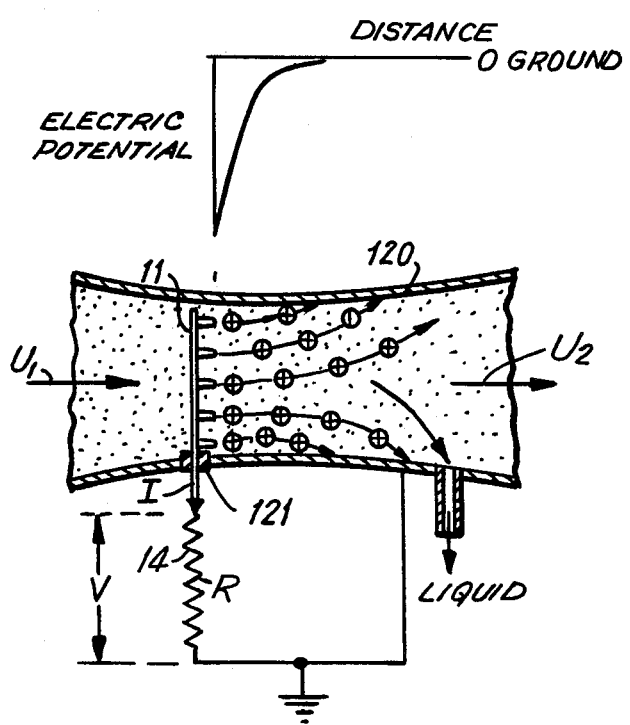

FIG. 27 shows a charged aerosol heat/electric power generator utilizing a single electrode source, with the charged aerosol discharging into the interior of the duct and showing the voltage created by the space charge.

Other synonyms and abbreviations for "charged aerosol" are: electrofluiddynamics EFD, electrogasdynamics EGD, and electrohydrodynamics EHD.

BACKGROUND OF THE INVENTION

Wind is an inexhaustable source of pollution-free power. Wind power has been used in a small way for thousands of years to propel sailing ships or to operate windmills, which are mechanical devices. The present invention is unique in that for the first time a means has been provided for the direct conversion of wind power to electric power without moving parts except charged water droplets.

According to this invention, a charged aerosol electrogasdynamic generator at atmospheric pressure is powered directly by the wind. It comprises a large area electrode screen which emits charged water droplets into the windstream as a wind/electric power transducer.

Figure 1:
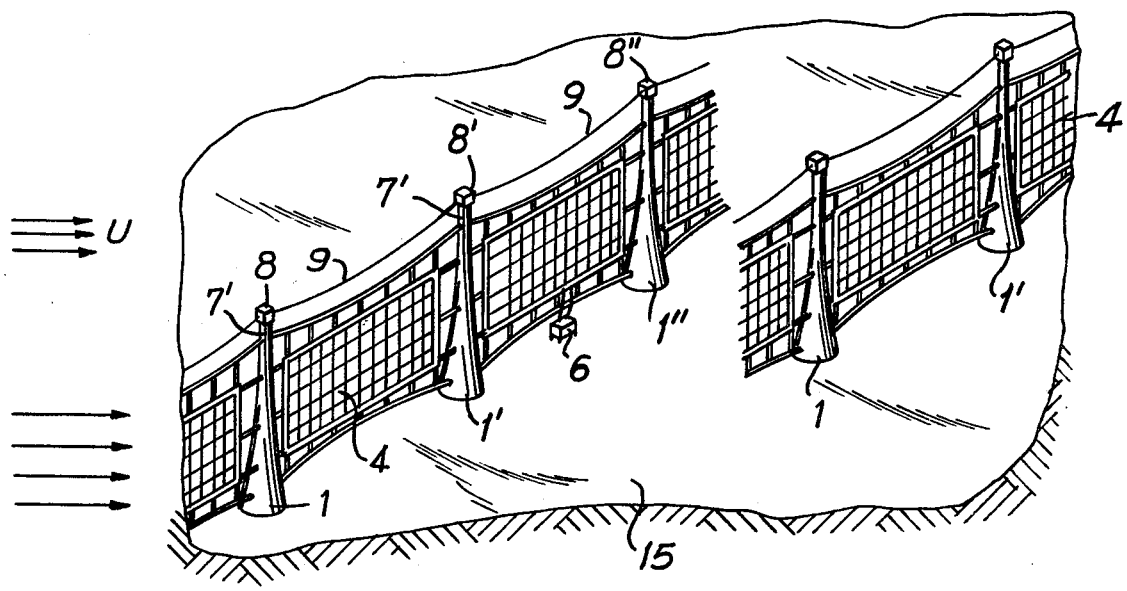
FIG. 1 shows a perspective view of a large scale wind/electric power EFD generator array.
Figure 2:
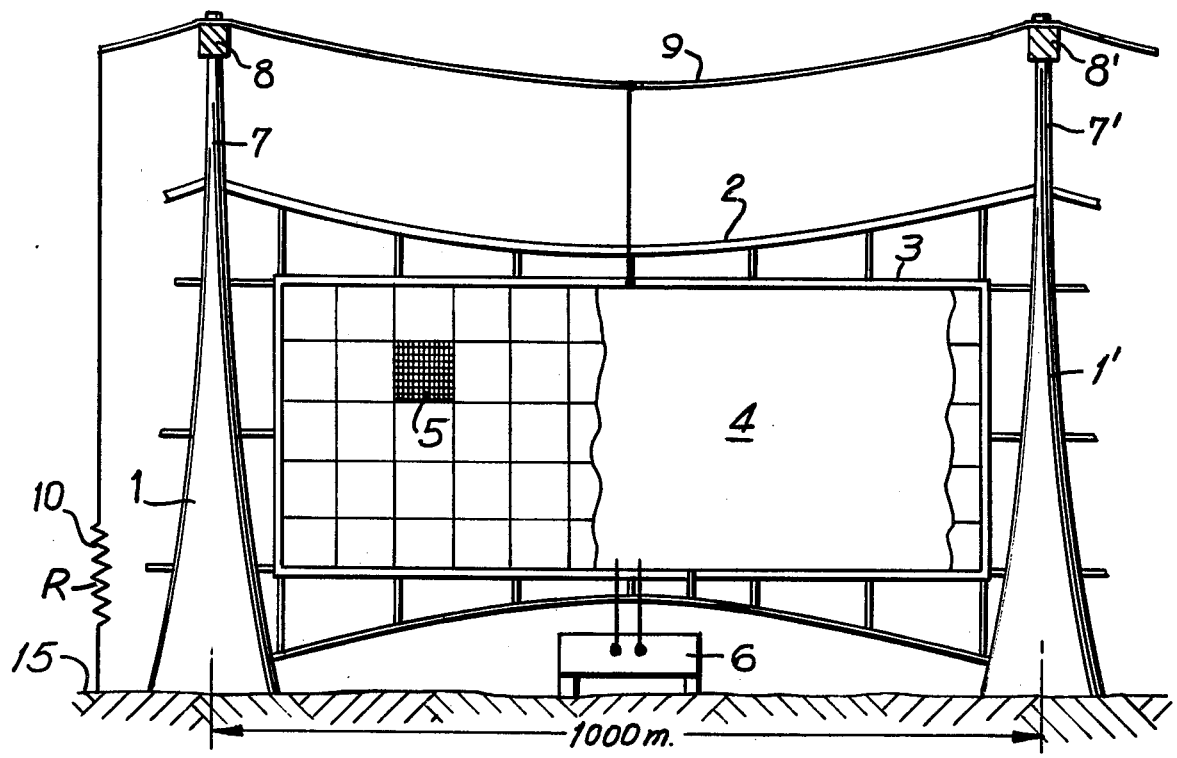
FIG. 2 shows a front view of FIG. 1.

In the wind/electric power generator shown in FIGS. 1 and 2, a large area electrode screen of special construction is mounted in a vertical plane to intercept the wind. Wind/electric power generators according to this invention will be installed at suitable geographical locations (updrafts at mountain ranges, along seashore fronts, etc.) where there is a steady strong flow of air in one direction at most times at 5 to 20 m/sec velocity.

Assuming a wind velocity of 10 m/sec, the wind power converted to electric power[2,3] is 0.45 kW/m$^2$. For example, such a screen 100 meters high and 1,000 meters long; or a screen area of 10$^5$ m$^2$/km will generate an electric power output of 45 megawatts/km at about 100,000 volts DC. If 10 such screens are spaced 1 km in depth, and extended in length of 100 km, 45,000 megawatts will be produced. These substantial amounts of electric power would be a great contribution to electric power requirements. The wind/electric power generator has relatively low investment and operating costs, and operates without pollution or detrimental environmental effects.

FIGS. 1 and 2, respectively, show a side view and a perspective view of a proposed full scale installation in which steel towers 1 and 1' may be about 150 meters high. Suspension cable 2 is provided, from which a rectangular metal frame 3 is suspended vertically, forming the rectangular area 4 which may be, for example, approximately 1,000 meters long and 100 meters high, forming a total area of $10^5$ m$^2$. Each section comprises modules 5, each of which may be prefabricated to dimension of about 4 m. Thus, for a 100 m high screen, there will be 25 modules in height and 250 of these modules in width. Each module would contain a heavy mesh of 10 cm$^2$ supporting a finer mesh of approximately 1 cm$^2$, which contains the charged droplet emitters. Socket fastening devices are provided so that the modules can be snapped into each other to provide mechanical and electrical linkages, and all of the screens are supported by the main frame 3. The voltage source for exciter electrodes is provided from a control blockhouse 6. The towers 1 and 1' extend above the screens, terminating in transmission line supports 7 having stand-off insulators 8. An electrical power cable 9 is suspended between the towers and connected to the screen 4 to feed the output electrical power to the power grid generally represented by the load resistor 10 to ground 15. An AC-DC converter may be utilized, and will be hereinafter described.

Figure 3:
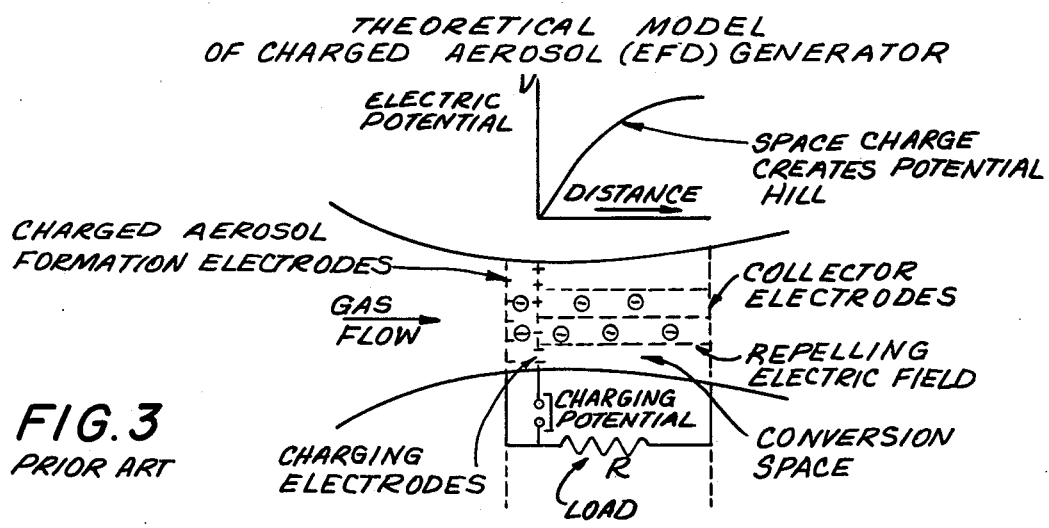
FIG. 3 shows diagrammatically a theoretical model of a charged aerosol generator.

A diagram showing the electrical circuit of a prior art charged aerosol generator is shown in FIG. 3, in which the collector is a separate electrode.

Charged aerosol sources previously described are:
The Condensatio Method, shown in FIG. 4[1.4].
The Electrojet Method, shown in FIG. 5[1.2].

Figure 6:
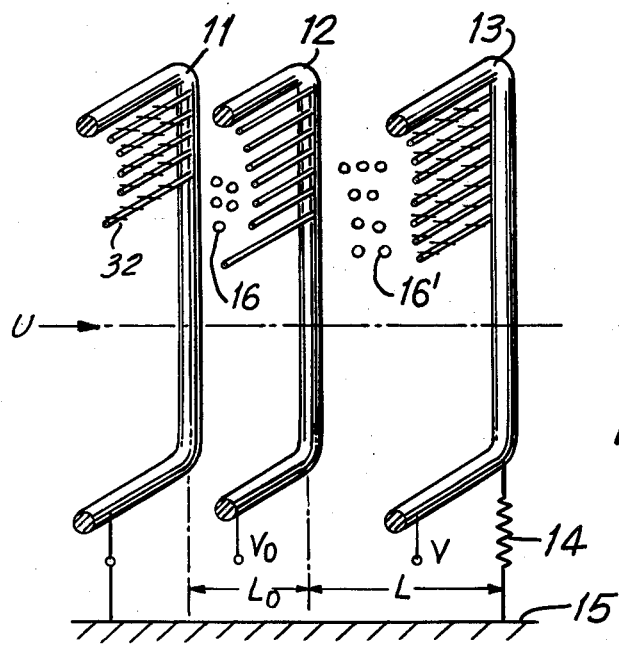
FIG. 6 shows a diagrammatic perspective view cut away on a vertical plane of a wind/electric power generator showing details of the emitter, collector, and exciter electrodes.

In the embodiment of the wind/electric power generator shown in FIG. 6, there are three electrode elements comprising emitter screen 11, an exciter electrode screen 12 and a collector electrode screen 13. The load 14 is connected between the collector screen 13 and ground 15, and the emitter is grounded. The emitter 11 produces charged droplets 16 which from a charged aerosol.

The results of a mathematical physics study of the wind/electric power generator are shown in FIGS. 7 and 8[3]. The study showed that the wind/electric power generated in a charged aerosol generator is:

$$P = \eta U \text{ watts/m}^2 \quad (1)$$

where $$\eta = (bk)^2 \epsilon_0/2 = 45.3 \quad (2)$$

In an enclosed device such as a heat/electric power generator, usually all of the emitter charges are efficiently collected, but even in such instance a physical collector is employed comprising points or tubes, etc.

In the atmosphere the problem of efficiently collecting the charged aerosol particles is more difficult and experimentally it has been determined that some of the charges escape collection so that a part of the electric power generated is dissipated thereby. In the present invention, none of the particles can escape utilization for power generation. All of the particles which are created and carried by the wind must originate from the emitter array and all of the current thus passing into the atmosphere necessarily must pass from the ground through the load to the emitter. Thus, with the present invention all of the current is utilized for power generation, and none escapes.

The scientific basis for this is shown in FIG. 9, which shows charged particles 16, 16' removed toward infinity from a single isolated conducting sphere 17 of radius $r_0$. According to the principles of electrical physics[4], work $W = QV$ is done in removing the charges to infinity. The potential V is generated at the surface of an isolated sphere of radius $r_0$ by charge Q, is:

$$V = Q/4\pi\epsilon_0 r_0 \quad (3)$$

and the electric field intensity E is:

$$E = Q/4\pi\epsilon_0 r_0^2 \quad (4)$$

FIG. 7 shows that a cloud of charged particles creates a space charge and an electrical potential hill in the vicinity of the charged particle source, and this electrical potential rapidly increases asymptotically to a maximum value. This maximum value $\overline{V}$ is substantially reached within a relatively short distance, usually a few centimeters, of the particle source and thereafter the value increases only negligibly, out to infinity. Referring to FIG. 7, in essence, I have discovered, once the collector electrode 13 is removed beyond an effective distance $\overline{L}$, the voltage $\overline{V}$ on the collector will not significantly increase at distances $L > \overline{L}$.

It has been shown[1.1]:

$$V = iL^2/2\epsilon_0 U \quad (5)$$

$$\widetilde{V} \approx \overline{V} \quad (6)$$

$$\widetilde{L} = (2\epsilon_0 \widetilde{V} U/i)^{\frac{1}{2}} \quad (7)$$

and the maximum electric field intensity $\overline{E}$ is limited by breakdown:

$$\overline{E} = 2\widetilde{V}/\widetilde{L} = b_g k \quad (8)$$

So that:

$$\widetilde{L} = 2\widetilde{V}/b_g k \quad (9)$$

In the present invention the isolated emitter lies within a potential well, from which particles must be removed by the wind or gas stream doing the work. The potential well is graphically shown in FIG. 10.

The present invention constitutes a fundamental simplification over the prior art. In the prior art device the source is usually grounded and a separate collector electrode is used, and the load is connected between the collector and ground.

In contradistinction, in the present invention as shown in FIG. 10, the load 14 is connected between the single electrode charged aerosol emitter array 11 and ground 15. The emitter 11 produces charged water droplets 16, 16' by any method, for example, Methods 1-8, inclusive and discussed hereinafter. The emitter 11 is supported on an insulating member 18. There is no separate collector electrode structure. The collector is virtual comprising the atmosphere and the entire ground surface of the earth. Thereby, the problem of efficiently collecting the charged particles from the emitter is solved. There is a further advantage of simplicity and decreased cost. Charged droplets 16 are entrained within the windstream of velocity U; and the wind does work to carry these charged particles 16 away from the charged droplet emitter 11. The charged droplets 16 are eventually dispersed in the atmosphere and discharged to a distant ground 15. The emission of charged droplets 16 from the electrode emitter array 11 constitutes an electrical current I at potential difference V from ground and this current returns to the emitter 11 via the load resistor 14 of resistance R; that is, V=IR, and p=IV.

The emitter produces a flow of charged droplets 16, 16', 16'' into the wind stream. The emitter 11 is powered by a source of input power 19 which may be electrical, water power, air power, steam power, nuclear power, solar power, etc. To provide optimum power transduction under atmospheric conditions, the charged droplets 16 preferably have a ratio of radius-to-the-number of electrons per droplet $r/N \approx 120$ Å/electron[2]. Calculation[3], graphed on FIG. 8, show that charged water droplets having a diameter of only 36 Å and one electron charge have a mobility of $2.5 \times 10^{-6}$ m$^2$/volt-sec, and will produce a power density of 210 watts/m$^2$ in a 10 m/sec wind; while charged water droplets having a diameter of 190 Å and one electron charge have a mobility of $10^{-7}$ m$^2$/volt-sec, and will produce a power density of 450 watts/m$^2$ in a 10 m/sec wind.

FIG. 11 is the same as FIG. 10, except that a portion of the generated power 19' is used to supply electric power to the emitter 11.

The charged droplet emitter 11 in FIGS. 10 or 11 may utilize any suitable charging methods; as for example, hereinafter described.

Stepdown DC-AC Power Converter

Referring now to FIG. 12, there is shown a stepdown DC-AC power converter generally shown as 20. This converter 20 is supplied by DC power from the emitter source 11. The high voltage DC at for example 33,000 volts is supplied to the centertrap 21 of the stepdown transformer 22 which, in this case, has a 300/1 turns ratio. A capacitor C is between emitter 11 and ground 15. The rotating contact of an interrupter SPDT switch 23 is connected to ground, and to the transformer coil at terminals 24 and 25. The SPDT switch may be actuated by a miniature motor 26 which is supplied by the output load; or, preferably a solid state switching device may be used instead. The output is AC power at about 110 volts. If the reversal occurs 120 times per second, then the output is 100 v, 60 Hz to the load 14.

Figure of Merit

The power output to actuate the charged aerosol emitter 11 is a small fraction of the electric power output from the wind/electric power generator.

To evaluate and compare different charging methods, a Figure of Merit $F_m$ has been defined for a charged droplet emitter:

$$F_m = 10^6 I/P_{in} = I_{\mu A}/p_{in} \quad (10)$$

Where I is the current in amps, and $p_{in}$ is the input power in watts. The input power is characterized by a voltage $V_{in}$; which in the case of steam, fluid, or air power is an equivalent fictitious voltage:

$$V_{in} = (p_{in}/I) \quad (11)$$

From (10) to (11), the input voltage is:

$$V_{in} = 10^6/F_m \quad (12)$$

The Figure of Merit $F_m$ is independent of the overall wind/electric power generator efficiency; however, an efficiency factor $E_f$ in % may be defined in terms of input power $p_{in}$ and output power p:

$$E_f = 100(p - p_{in})/p \quad (13)$$

Since, in the single electrode circuit, all the charged droplet current is utilized:

$$p = I\overline{V} \quad (14)$$

Where $\overline{V}$ is the voltage on the emitter electrode relative to ground.

$$E_f = 100(\overline{V} - V_{in})/\overline{V} \quad (15)$$

From (12) and (15), the % efficiency may be expressed in terms of the Figure of Merit $F_m$ and the voltage on the emitter electrode $\overline{V}$:

$$E_f = 100[1 - (10^6/\overline{V} F_m)] \quad (16)$$

For example, if $F_m = 100$ μA/watt and $\overline{V} = 100{,}000$ volts:

$$E_f = 100[1 - (10^6/10^2 \times 10^5)] = 90\% \quad (17)$$

The inventions herein described may employ various methods to produce charged droplets having r/N ratios suitable for optimum atmospheric power transduction[2]. Certain of these methods are listed below with their prior art references, if any. For most of these methods little was known about the relationship between the parameters to achieve a large Figure of Merit under atmospheric conditions.

TABLE NO. I
METHODS OF PRODUCING ATMOSPHERIC CHARGED AEROSOLS

| Method No. | Title | Fig. Nos. |
|---|---|---|
| 1. | Water/Metal Contact Charging | 13–15, 5 |
| 2. | Steam/Metal Contact Charging | — |
| 2.1 | Steam Source: External Supply | 16 |
| 2.2 | Steam Source: Flash Boiler, Internal Supply | 17 |
| 3. | Condensation Charging | — |
| 3.1 | Ion Source: Internal Point - Air Water Vapor | 4 |
| 3.2 | Ion Source: External Point - Steam Source: External | 18 |
| 3.3 | Ion Source: Internal Point - Steam Source: Flash Boiler | 19 |
| 4. | Electrojet Charging - Water/Air | 5 |
| 4.1 | Induction Charging - Compressed Air | 20–22 |
| 4.2 | Induction Charging - Compressed Free Air | 23–24 |
| 4.3 | Water/Metal Contact Charging | 5 |
| 5. | Induction Charging - Water Jet | — |
| 5.1 | Exciter Electrode: External | 25 |
| 5.2 | Exciter Electrode: Internal | 26 |
| 6. | Liquid Surface Instability | not shown |
| 7. | Bubbling Air Through Liquid | not shown |
| 8. | Impact of Microjet on a Solid Surface | not shown |

DISCUSSION

Comparing an emitter in a Heat/Electric Power Converter, which produces a charged aerosol at high pressure, with an emitter in a Wind/Electric Power Converter, which produces a charged aerosol issuing into the atmosphere, the latter involves a new set of physical conditions which are discussed hereinafter.

Relative to power output using negatively charged droplets, positively charged droplets provide increased electric power output. Therefore, the emitters herein described are usually connected to produce positively charged water droplets. For example, in Method 5.1, shown in FIG. 25, the external exciter electrode is made negative relative to the microjet water source.

Methods 1 and 2 require no input electric power because the charges on the water droplets are generated by the potential difference due to contact of steam or water with a metal surface.

To obtain a relatively large current of about 1 $\mu$A by water/metal contact charging, the water microjet issuing from a small orifice must be immediately broken into droplets by a large velocity ($\sim$350 m/sec) airjet (electrojet principle).

With a small velocity air flow (wind velocity $\sim$10 m/sec) only a very small current (a few nA) is obtained from a water microjet from a small orifice, too small to be useful for use in a wind/electric power converter. However, a voltage on an external exciter electrode can draw about 0.2 $\mu$A from a 100 $\mu$m diameter water microjet for a few mm, until breakup occurs in a natural wind stream (Method 5).

In an electrojet emitter of Method 4, shown in FIG. 5, a water jet of a small velocity enters a nozzle in an air stream of large velocity and in a strong electric field; whereupon the water jet breaks into charged droplets projected into the wind stream at atmospheric pressure.

Comparatively, in an air/water microjet, shown in FIG. 25, of Method 5, a water jet issues from a small diameter orifice at a velocity $U_j$ into the wind stream at atmospheric pressure in an electric field. The jet velocity $U_j$ is produced by water pressure only. The water jet breaks into charged droplets due to electrical and drag forces between the water jet and the air.

As a further comparison in the Compressed Free Air Electrojet emitter of Method 4.2, shown in FIGS. 23 and 24, an air foil is employed to increase the air velocity around the water jet, thus facilitating its breaking into charged water droplets.

Method 1—Water Jet/Metal Contact Charging

In this method, a water microjet produces charged water droplets by an electrochemical potential difference of usually less than 1 volt between the water and a metal, while the electrical output is many thousands of volts. No external electrical input is required. The water microjet disperses into droplets as it emerges into the wind. Water Jet/Metal Contact Charging emitters are shown in FIGS. 5 and 13–15, inclusive.

The theory of Water Jet/Metal Contact Charging may be understood by reference to FIG. 13. The Water Jet/Metal Contact establishes a voltage difference between the water and the metal; an electron is absorbed or donated by the metal and produces an excess of ions of one sign in the water which, upon emerging from the orifice as a jet into the wind, breaks into charged droplets 16, and the wind carries away an electric current I.

A microjet issuing from an orifice in a flat plate smaller than about 70 $\mu$m diameter, caused a layer of water to form over the orifice which stopped the microjet.

The problem arises because a small diameter water jet does not have the energy to break through a water layer which may form on the front surface or an orifice in a flat plate. There is a dead air space in front of a flat plate and the wind air stream velocity reaches the microjet some distance in front of the orifice, where the droplets break away from the microjet.

The formation of the water layer is avoided using a microjet issuing from a capillary tube, a conical point, or tapered linear edge. With these shapes, the layer has a small diameter, and a small diameter jet has enough energy to break through and carry away the impeding water layer; aerodynamic air flow occurs in the immediate vicinity of the orifice, and the issuing microjet therefore breaks into droplets very close to the orifice.

It is necessary to immediately break and separate the microjet into charged droplets. If this is not done, then a charged droplet aerosol does not form. A continuous microjet will not carry the electrical charge much beyond the orifice because the space charge of the ions in the continuous microjet opposes the carrying off of the current. Only moving charged droplets separated by an air space will carry away a current. If the air space between the droplets is too little, then a flashback may occur between the droplets, thus limiting the maximum voltage potential which can be achieved on the electrode from which the microjet issues.

FIG. 14 shows a slit emitter 27 having a length "a" and width "b" which emits a charged aerosol electric current I of several $\mu$A/cm.

In FIG. 15 there is shown an array of slits 27, 27', 27'', etc. in a pipe 28 along an axis Y Y'. The pipe 28 has an aerofoil shape with downstream linear edge 29. The slit orifices 27 are located on the edge 29. Liquid water 30 under pressure enters the inside 31 of the piper 28. The water is forced through the slits 27, 27', 27'' and breaks into charged droplets 16. The air flow over the aerofoil shape past te linear edge 29 prevents the formation of an impeding layer over the slits. Various means may be employed to assist in the droplet breakup as will be apparent from the foregoing. As examples, any of charging methods 1, 4, or 5 may be employed.

An example of the dimensions of the narrow slits shown in FIG. 15; slits 27 , 27', 27'', may have the dimensions: length a=900 $\mu$m, height b=8 $\mu$m, and the separation between slits c=100 $\mu$m. For such a slit array, the current is about 1 $\mu$A/slit and the water flow is about $2.6\times10^{-2}$ cm$^3$/sec-slit. At a water velocity of 3.6 m/sec, $10^4$ of these slits at intervals of 1 mm, and 1 m long covers 1 m$^2$. Such an array produces $10^4$ $\mu$A/m$^2$ with a water flow of 260 cm$^3$/sec-m$^2$. The jet input power is 1.7 watts/m$^2$ from a miniature pump driven electrically from the output of the total array. The input electric power is small relative to the output electric power.

The output of the wind/electric power device with this charging means at 10 m/sec is about 450 w/m$^2$ at 45,000 volts.

Method 2—Steam/Metal Contact Charging

Method 2 produces the charged aerosol from steam utilizing steam/metal contact charging. An advantage of this method is that no separate input electric power source is required. A disadvantage of the method is that the heat input is considerable, unless the orifice diameter is restricted to a few microns to minimize the heat flow.

FIGS. 16 and 17 show wind/electric power generators using this method.

Old references[5] show that steam is charged upon contact with and partial condensation upon a metal body such as brass. Contrary to the theory expressed in these references that the charges are caused by friction, a theory more consistent with the present knowledge is that the charging is electrochemical. The electrical power for ionization is supplied by contact potential difference produced at the point of impact of steam molecules, which are ionized or charged upon contact with, and condensation upon a cooler metal surface; charged water ionic nuclei being formed and suspended in saturated steam. When the steam is further expanded in its passage through an orifice, additional water vapor condenses on the water ions and a charged aerosol suitable for power transduction is produced.

Referring to FIG. 16, the first portion of a metal tube 38 is surrounded by a heat insulator 35, providing a chamber 34 into which superheated steam enters and is filtered through a porous sintered metal disc 47. The forward portions of the tube 38 of length B is exposed to the atmosphere and is cooler than the insulated portion of the tube 38 of length A. In operation, a steam molecule 32 from the steam chamber 34 impinges at 36 upon the cool inner surface of the tube 38, loses energy, and an electron 39 is captured by the metal. The water molecule 82 then rebounds from the impact point 36 as a positive ion or charged water molecule 40 having a decreased kinetic energy. Neutral steam molecules then condense on ion 40 which flows toward the orifice 42 in the plate 43. The front portion of the emitter comprises an insulating plastic cap 44. The steam is emitted as a jet 48 of velocity $U_j$ comprising positively charged droplets 16.

The charged droplets may grow to longer charged particles by acquisition of atmospheric moisture from residual supercooled jet steam. The orifice plate 43 may be a thin stainless steel plate approximately 12 $\mu$m thick through which a 3 $\mu$m hole has been produced by a laser or electron beam. The metal body 38 is connected via the load resistor to ground. The charged droplets eventually find their way to ground, returning via ground and the load resistor to complete the circuit on the metal tube 38.

As shown in FIG. 17, the device shown in FIG. 16 may use, in lieu of a separate source of superheated steam, electric heating elements 46 provided along the length A of the tube 38. Instead of superheated steam, liquid water 30 can be introduced via pipe 33. Thus, the chamber 34 becomes a flash boiler. The device is miniaturized to consume less than 10% of the electric output power. The superheated steam alternatively may be produced by a solar boiler, not shown.

The forward interior of the tube 38 may be provided with a metal plating 41 suitable for contact charging; for example, a gold plating provides a large contact voltage difference, and avoids oxidation of the surface.

The charge produced on the water droplets may be either positive or negative depending upon the metals employed. The difference in potential between pure water and a given elementary metal may be obtained from the electromotive series[6]; for example, copper and gold produce positively charged steam, while titanium and hafnium produce negatively charged steam. This charging method has the advantage of requiring zero electrical input to the device; thus the only power required will be the relatively small power required to heat the body of the microboiler and drive a miniature pump to provide the water flow required. The forward portion of the device within the length B may be provided with a porous sintered packing of a powdered metal (not shown) to increase the interior surface area exposed to the condensing steam, and thus increase the current emission.

Method No. 3—Condensation Charging

Figure 4:
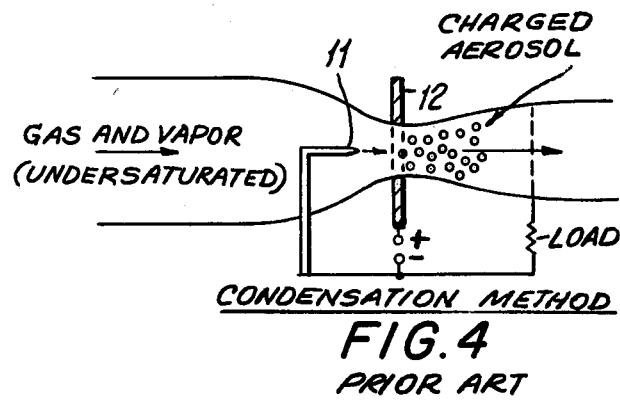
FIG. 4 shows a Condensation Method of forming a charged aerosol in a charged aerosol generator.

This Method is described in the prior art[1,4] and is illustrated in FIG. 4. In this method a gas or vapor is cooled by expansion in a nozzle causing condensation of the vapor in the presence of ions. The ions usually are provided by a point ionizer 11 and exciter electrode 12. The ions act as nuclei upon which the vapor condenses forming charged droplets. Various methods of producing charged aerosols by condensation charging are described hereinafter, which have application to wind/electric power generators, but which may be employed for other purposes as above noted.

The various methods are shown in FIGS. 4, 18, and 19. Method 3.1, shown in FIG. 4, uses Air/Water Vapor with an internal point ionizer. Method 3.2, shown in FIG. 18, uses a Steam Microjet Emitter with an external point ionizer. Method 3.3, shown in FIG. 19, uses a Steam Microjet Emitter and an internal point ionizer with the steam supplied by a miniature flash boiler.

Method 3.1—Condensation Charging with Air/Water Vapor

A tungsten needle point was axially located in an air nozzle of about 2 mm diameter with supersonic air velocity at the throat. The charged aerosol current output increases nearly linearly with the pressure from about 2 $\mu$A at 1 atmosphere to about 190 $\mu$A at 40 atmospheres.[8]

In the wind/electric power generator, the jet emerges at atmospheric pressure. Although the condensation method produces a satisfactory current output, calculations shown that it cannot be utilized in an efficient wind/electric power array, unless modified as described hereinafter. FIG. 4 shows a device using the condensation method. With 60 psig input pressure and an orifice diameter of about 1.6 mm, the electrical output power is about 0.1 watt. The output current is about 3.2 $\mu$A at 30,000 volts, obtained with atmospheric output pressure.

A mathematic physics study was made of the condensation method using compressed air saturated with water vapor. A computation utilizing a 1.6 mm (1600 $\mu$m) diameter orifice used in our initial tests showed that the air power input was excessively large. It was found that if the diameter of the nozzle was decreased to 20 $\mu$m, the input air power was decreased to $2.25\times10^{-2}$ watts, an acceptable value; but if fully saturated with water, and if all the water condensed to form an optimum charged aerosol, the output current was too small; that is, only $5.2\times10^{-3}$ $\mu$A. Hence, the condensation method using compressed air saturated with water vapor at 1 atmosphere has a Figure of Merit $<0.23$ $\mu$A/watt and is not efficient enough for a useful Wind/Electric Power Generator.

Method 3.2—Condensation Charging, Steam Microjet—External Point Ionizer

Earlier work[7,3] on a Charged Aerosol Heat/Electric Power Generator was done with high pressure steam through nozzles with throat diameters of a few mm. In the present work, steam is emitted as a microjet at atmospheric pressure, which involves new physical conditions. In both cases, the current density produced is proportional to the number of charged droplets produced per unit time.

A mathematical physics study was made for the condensation method using a steam microjet which determined the parameters for the efficient designs hereinafter described.

FIG. 18 shows an assembly of steam microjet emitters 50, 50'', 50Δ. Heat-insulated metal pipes 51, 51', 51'' are connected to a heat-insulated superheated steam metal feeder pipe 52, electrically insulated from ground by an insulating tube 53. An insulating cap 44 of a plastic such as Delrin, is screwed onto the end of the brass tube 51, retaining an orifice plate element 43 supported between plastic insulating discs 49 as shown in FIG. 16 and 49'. The orifice plate 43 is a stainless steel sheet about 12 μm thick containing an orifice hole of diameter $d_j$ (for example 3 μm) through which the steam jet is emitted. The 3 μm hole may be drilled by a laser beam. Ions 54 are provided by the emitter points 55, 55', 55'' which are connected via supporting bus bar 56 through the load 14 to the ground 15. The charging voltage source 19 is floated. The microjet 58 is emitted in a cone 59. A potential difference ($V_2$-$V_1$) is applied between the emitter points 55, 55', 55'', etc., and the steam orifices 60, 60', 60'', etc. respectively. Positive ions 54 are emitted by the point 55 which travels toward the orifice 60. The steam in the microjet condenses upon these positive ions forming charged water droplets about 80 Å in diameter. These are entrained by the wind of velocity U and carried along the trajectory 61, eventually finding their way to ground 15. The cloud of charged particles produces a space charge and an electric field shown in the graph at the lower left of the Figure. The entire emitter assembly is located in the electrical potential well at the voltage $-V_1$ shown in the graph. Work is done by the wind to carry the particles from the potential well up to ground potential.

A negative potential is created on bus bar conductor 56 because positive ions are being removed from the conductor and eventually discharged to a distant ground. A current I flows through the load 14 to supply this loss. On the potential diagram: the distance X is taken from the emitter along the conversion space to a point 62 on the trajectory 61 of the charged droplet 16. The potential at the bus bar 56 is $-V_1$ and the potential at the orifice 60 is $-V_2$. The upstream potential gradient 67 is linear because space charge is absent, but the downstream space charge has a parabolic potential-distance curve 63 because of the presence of space charge; which approaches ground potential asymptotically in a short distance, $\overline{L}$ to near ground potential 0.

Method 3.3—Condensation Charging, Microjet—Internal Point Ion Source—Flash Boiler Steam Source FIG. 19 shows a condensation charged aerosol generator employing a point emitter to supply an ion current to a steam jet to provide charged nuclei in superheated steam vapor, which subsequently condenses to form charged water droplets for optimum charged power transduction. This emitter is powered by a miniature flash steam boiler which operates on 1-10 mw input electric power. The miniature steam boiler is shown (not to scale) at a magnification of about 10 times. The orifice diameter $d_j$ is 2 to 5 μm.

The charged droplet emitter 64 comprises a metal pipe 38 to which is fastened an insulation cap 65 of plastic, pyrex or sapphire. The cap 65 comprises an outer cap 65, an inner cylinder 66 with a conductive layer 67 sandwiched between. The conductor 67 is connected to one terminal 68 of an exciter voltage source 70, the other terminal 69 is connected to the point ion emitter 71. The pipe 38 is wound with a heating coil 46. The heat is conserved by the insulation 35. A small fraction of the output electric power provided by a step-down DC-AC converter 72 provides 110 volts AC power to operate the ionizer electrodes 67, 71; the heating coils 46, and the water pump motor 73 which turns a small water supply pump 74; and a control circuit 75. The water pump 74 provides a water flow through the input pipe 38 to the flash boiler interior 34. The flash boiler is operated, for example, at 90 psi at 160° C. (320° F., 4.91 ft$^3$/lb.). The boiler temperature actuates the thermosensor element 76 which operates a relay 77 controlling the power input to the heater element 46 maintaining the boiler temperature nearly constant. The parts 65, 66, and 67 may be fused or adhered together at their interfaces, using a suitable cement.

Steam issues from the orifice 42 with a velocity $U_j$. Ions are emitted from the tungsten point 71 toward the exciter 67 at the orifice 42. As the steam issues from the orifice 42, it is strongly cooled and condenses upon the ions from the tungsten point to form charged water droplets 16.

Positive or negative ions may be emitted from the point 71. Although positive or negative charged water droplets both operate, the positively charged droplets appear preferable.

Because of the very small diameter $d_j$ of the orifice (about 3 μm) the power of the steam jet is limited to about 1-4 mw. The charged water droplets 16 appear to form with an optimum r/N ratio; that is, about 130 Å radius and containing a single electron charge. These charged droplets have such low mobility that they slip only about 2% in a windstream having a velocity of about 18 m/s. These are suspended in and are carried by the windstream of velocity U, which drives the charged aerosol cloud to transduce the wind power to electric power, at a high voltage; for example, 30,000 volts. While a collector structure such as is shown in FIG. 6 may be employed, it is preferred to use the single electrode circuit previously shown and described herein.

Method 4—Electrojet Charging—Water/Air

Figure 5:
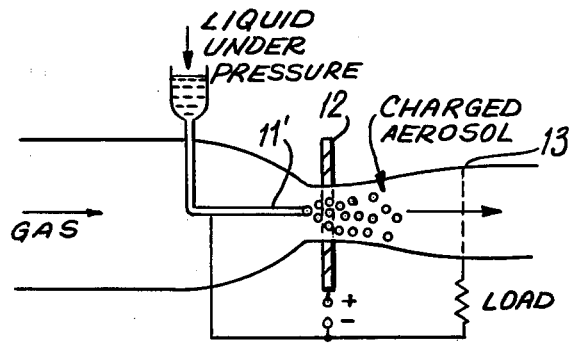
FIG. 5 shows an Electrojet Method of forming a charged aerosol in a charged aerosol generator.

Early work[1,2] on the electrojet method using the device shown in FIG. 5 was done on a Heat/Electric Power Charged Aerosol Generator using compressed air at a pressure of many atmospheres. In this method a small diameter water jet issues from a tube in a strong electric field into a stream of high velocity compressed air issuing from a nozzle. Charges are induced on the water jet. The charged water jet is broken into small charged droplets carried away from the nozzle by the air stream. An electrojet with a single water jet in a closed pressurized system[8] at 600 psia produced currents up to 190 μA.

Method 4.1—Electrojet—Induction Charging

The electrojet method produces no low mobility particles when the water input and air velocities are small. For example, referring to FIG. 5, when the water velocity from a 200 μm I.D. tube was 0.16 m/s in an air stream at 10 m/s, only large mobility (small diameter, many electric charges) charged water droplets were produced and substantially no downstream collector current was obtained.

In the same device, when the water jet velocity is 1.2 m/s, with the air jet at about 350 m/s, and −4 kV is applied between the tube emitter and exciter, a current of 3.2 μA is obtained at the collector. The nozzle diameter was about 1.6 mm (1600 μm), hence an excessively large input air power was used, resulting in the very small Figure of Merit of 0.03 μA/watt. An example is:

| | |
|---|---|
| Emitter-Exciter Spacing | 0.75 mm |
| Exciter-Collector Spacing | 69 mm |
| Orifice diameter of nozzle | 1.6 mm (1600 μm) |
| Inside diameter of emitter* | 0.203 mm (203 μm) |
| Inlet air and water pressure | 40 psig |
| Water flow | 0.038 cm$^3$/s |
| Water jet velocity | 1.2 m/s |
| Emitter voltage | −4.0 kV |
| Emitter current | 5 μA |
| Exciter voltage | 0V (ground) |
| Exciter current | 1.8 μA |
| Collector voltage | +11.8 kV |
| Collector current | 3.2 μA |
| Input power (electric) | 20 mw |
| Output power (electric) | 37.8 mw |
| Net power (electric) | 17.8 mw |
| (Input power/output power) × 100% | 53% (electric) |

*Number 37 stainless steel tube (Needle)

FIGS. 20, 21, and 22 show a microelectrojet emitter. Compared to the above example, the dimensions have been decreased to minimize the input air and water power relative to the output current. For example, for 1 μA output, with a 20 μm diameter annular air jet surrounding a 5 μm diameter water microjet, the Figure of Merit is about 150 μA/watt, which is a useful value for a wind/electric power generator and other devices employing charged aerosols.

FIG. 20 and the magnified views FIGS. 21 and 22 show an assembled microjet emitter employing Method 4.1.

In FIG. 20, charged particles 16 from the emitter 82 eventually find their way to ground 15 and return via the load 14 to the emitter, which is connected in a single electrode circuit, previously described. The emitter comprises a tube 82, having a filter element 47 and a stainless steel disc assembly located at the nozzle section, generally indicated as 85. Compressed air 91 and liquid water 79 feed into the nozzle section 85, where a microelectrojet causes the emission of charged droplets 16, having a forward velocity $U_j$ into a wind stream of velocity U.

FIG. 21 shows a section of the assembled emitter 82, shown in FIG. 20. The pipe 83 is supplied with water 79 under pressure, which passes through a filter 47, and enters into the chamber 84 from whence it discharges under pressure through a stainless steel plate 88 having a small orifice 86 of about 5 μm in diameter, and which is adhered to the flat face of the tube member 87.

FIG. 22 shows a magnified sectional view of the emitter 82. Spaced from the stainless steel orifice plate 88 is the exciter plate 91 which has a larger diameter orifice 92, for example, 20 μm. Compressed air 90 is supplied between the plates 88 and 91 through the annular space, and issues through the orifice at 92, mixing with and disrupting the water jet 89, issuing from the smaller orifice 86 in the plate 88. The plates 87 and 91 are maintained at potentials $V_1$ and $V_2$, respectively, and the applied electric field causes the induction charging of the jets 89. The water jet is disrupted by mixing with the high velocity air flow at orifice 92 and issues as charged aerosol particles 16.

Method 4.2—Free Air Electrojet

FIGS. 23 and 24 show an embodiment of a free air electrojet. FIG. 23 shows a section through the axis XX′ of a free air electrojet and FIG. 24 shows a plan view normal to the axis on the YOZ plane; the point O being taken at the exit plane of the orifice.

In FIG. 23 a metal pipe 94 is supplied with water through a porous metal sintered filter 95, which filters out particles>0.5 μm. Axially supported within the cone 96 at the end of the pipe 94 is a capillary tube 97 having an inside diameter of about 2–20 μm and outside diameter of about 75–100 μm. The filtered water passes through the capillary tube 97 and issues under pressure as a water jet 98 in the presence of an electrical field, lines 99, 99′ between the exciter electrode 100 and the jet 98. A hollow cone 101 with an orifice 102 at its apex is positioned with its axis along the water jet axis. A wind stream 103 of velocity U separates into two parts; a part 104 within the cone 101 and a part 105 exterior to the cone 101. The stream lines 104 converge within the cone and the stream lines 105 diverge exterior to the cone; a differential pressure is produced between the interior and the exterior of the orifice 102, and the airstream increases its velocity through the orifice. This increased air velocity and the electric field forces causes the jet 98 to break into charged droplets 16 having an average radius r and an average charge N. The r/N ratio and hence the mobility of the charged droplets are controlled by the water pressure and the electric field intensity. The exciter electrode 100 is sandwiched between insulating cone 101 and disc 106. The insulating cone 101 is supported by three struts 107, 108, and 109. A single electrode electric circuit, previously described[3], is preferred.

Method 4.3—Electrojet Water/Metal Contact Charging

This method is similar to that already discussed under Method 1, except that in this method the water jet is surrounded by an air jet at near sonic velocity. The principle of this method is illustrated in FIG. 13. The charged aerosol current is due to a water flow containing an excess of one sign of ion concentration which results from the contact of water with a metal surface. The ions are removed by the flow of water at velocity $U_j$ parallel to the surface of the metal. The current I is proportional to the perimeter of the metal surface along which a double layer exists. In the case of a rectangular slit, as illustrated in FIG. 14, the current I is proportional to (a+b), and the water flow velocity $U_j$.

As an example, with the electrojet device shown in FIG. 5 with the electric current shown in FIG. 10, currents of 0.1 to 2 μA and potentials to 15,000 volts were obtained utilizing a grounded collector, and passing the current through a load placed between the water jet emitter and ground. A 200 μm I.D. stainless steel tube was used for the fluid water jet. These results were not obtained unless the water jet is surrounded by an air jet at near sonic velocities.

Method 5—Induction Charging—Water Jet

In Method 5, a water microjet of diameter $d_j$ and velocity $U_j$ issues into a wind stream of velocity U in the presence of an electric field. Charges are caused to flow into the water jet, which breaks into charged droplets. Method 5.1 shown in FIG. 25 uses an external exciter electrode; Method 5.2 shown in FIG. 26 uses an internal exciter electrode.

Method 5.1—Induction Charging—Water Microjet—External Exciter Electrode

FIG. 25 shows a water microjet issuing down stream into the wind in which the electric charge on the droplets is induced by a down stream exciter electrode. The emitter is generally the same as that described in connection with FIGS. 23 and 24, except that the cone 101 is omitted. The exciter electrode consists of thin metal disc 100 sandwiched by insulating pieces 106' and 106.

Results of these tests using stainless steel tubing with a 76 μm I.D. show that Figures of Merit of 200-400 μA/watt are obtainable in the 25-60 psig pressure range.

For an example of cases where a net output power was measured, see Table II. These results, obtained without optimizing the device, demonstrate that a favorable Figure of Merit is obtainable. Using a tube with a smaller inside diameter will decrease the jet kinetic power, increase the Figure of Merit, and increase the net output power.

TABLE II

| Pressure on Water | | = 45 psig |  |
|---|---|---|---|
| Volume flow Rate | | = .21 × $10^{-7}$ $m^3$/s | |
| Jet Kinetic Power | | = .218 mW | |
| Air Velocity (m/s) | | 13.7 | 14.7 |
| Load Current | (μA) | 0.039 | 0.040 |
| Load Voltage | (kV) | 8.0 | 8.8 |
| Output Electric Power | (mW) | 0.312 | 0.352 |
| Exciter Current | (μA) | 0.043 | 0.049 |
| Exciter Voltage | (kV) | 2.0 | 2.0 |
| Input Electric Power | (mW) | 0.086 | 0.098 |
| Figure of Merit | (μA/w) | 128.3 | 126.6 |
| Net Input Power | (mW) | 0.304 | 0.316 |
| Net Output Power | (mW) | 0.008 | 0.036 |

Method 5.2—Induction Charging—Water Microjet, Internal Exciter Electrode

FIG. 26 shows an electromicrojet with internal exciter. The insulated tube 115 has a circular or slit metal orifice 116. The upstream electrode 117 is axially mounted within the tube 115. A small electric power source 19 supplies the potential difference between the orifice 116 and the electrode 117. The voltage applied across the water-metal interface produces an excess of ions which are carried away by the water jet 98. The velocity $U_j$ of the water jet 98 exceeds the upstream velocity of ions in the water jet because the electric voltage applied between electrodes 116 and 117 is small and these ions are carried forward by the jet and break up to form charged droplets. The voltage source 19 is adjusted so there is little or no upstream current.

The scientific principles underlying Methods 6, 7, and 8, listed in Table I, have been previously described, and structures and figures embodying these principles were reported[3], but are briefly described hereinafter (no figures included):

Method 6—Liquid Surface Instability Charging

In a charging device according to this method, a shallow body of liquid (water) supported in a channel in a windstream with an exciter electrode mounted above the liquid surface.[9] A large electric potential is applied between the exciter electrode and the liquid surface. The liquid surface accumulates electric charge by induction, causing a surface wave and discontinuities to form, emitting charged droplets into the windstream which produces a charged aerosol.

Method 7—Air Bubbling Through a Liquid-Charging

In a charging device according to this method, the structure is the same as in Method 6 above, except that the applied electric potential is small and air is bubbled through the shallow liquid causing the ejection of small droplets of water which are charged by induction in the applied electric field, and carried away by the windstream as a charged aerosol.[10]

Method 8—Impact of a Microjet on a Solid Surface

The charging device according to this method is similar to that shown in FIG. 26, except that the jet is impinged onto a solid surface which aids in the droplet breakup. On breakup, the water droplets are charged and the air is oppositely charged.[11,12] It is preferred to use an exciter electrode to inductively control this charging and to scavenge charges of the opposite sign.

Heat/Electric Charged Aerosol Power Generators have been described in the prior art[1.1-1.6].

An embodiment of this invention may be employed in the conversion section of a Gas Flywheel Heat/Electric Power Generator[1.6] shown in FIG. 27. In this embodiment the separate collector electrode is eliminated, being replaced by the grounded wall of the duct 120; and instead a single emitter array 11 is employed, which is insulated from the duct by the sleeve 121.

The high potential terminal is the emitter array 11, and the other terminal is the grounded metallic body 120 of the generator duct. The electrical power conversion efficiency is increased because all the charged droplets are collected and discharged. In the prior art, friction gas power loss was caused by the flow of high velocity gas over the collector electrode located in the gas stream. In this embodiment, the friction gas power loss is eliminated.

The novel charged aerosol emitters of this invention hereinbefore described may be employed in a charged aerosol heat/electric power generator, for air purification, weather modification, airport fog clearance, for dispersed chemical reactions, and other applications.

The experimental results reported herein are preliminary, and are not to be considered as limiting.

In a charged aerosol generator such as illustrated and described in connection with FIG. 27, in lieu of water, other working fluids may be employed. For example, as described in a referenced prior art U.S. Pat. No. 3,297,887, issued to A. M. Marks on June 10, 1967, column 9, paragraph 2, a liquid metal gallium is described, which may be employed in lieu of water. In the case of a condensation type emitter a metal vapor may be used in lieu of water vapor.

Various other embodiments may be employed using the principles set forth herein, without departing from the scope of this invention.
REFERENCES:
1. List of U.S. Patents on Generator 1.1 U.S. Pat. No. 2,638,555 "Heat-Electrical Power Conversion Through the Medium of a Charged Aerosol", issued 5/12/53.
1.2 U.S. Pat. No. 3,191,077 "Power Conversion Device", issued 6/22/65.
1.3 U.S. Pat. No. 3,297,887 "Heat-Electrical Power Transducer", issued 1/10/67.
1.4 U.S. Pat. No. 3,411,025 "Method and Apparatus for Producing Charged Aerosols" issued 11/12/68.
1.5 U.S. Pat. No. 3,417,267 "Heat-Electrical Power Interconversion Devices", issued 12/17/68.
1.6 U.S. Pat. No. 3,456,135 "Gas Flywheel Power Converter", issued 7/15/69.
1.7 U.S. Pat. No. 3,518,461 "Charged Aerosol Power Conversion Device and Method", issued 6/30/70.
1.8 U.S. Pat. No. 3,792,293 "Generator with Charging and Collecting Arrays", issued 2/12/74.
2. "Optimum Charged Aerosols for Power Conversion", by Alvin M. Marks reprinted from *J. Appl. Phys.*, Vol. 43, No. 1, January 1972.
3. National Science Foundation Final Report on Wind Power Charged Aerosol Generator, prepared under Contract/Grant No. AER 74-18650, September 1976, principal investigator: Alvin M. Marks [to be published]
4. *American Institute of Physics Handbook*, McGraw Hill, New York, 1957, pp 5–21.
5. Armstrong, W. G., *Philosophical Magazine and Journal*
   5.1 "On Electricity of Effluent Steam", No. II, 1841, pp 50–57.
   5.2 "On the Electrical Phenomena Attending the Efflux of Condensed Air, and of Steam Generated under Pressure", No. LV, 1841, pp 328–357.
   5.3 "On the Efficacy of Steam as a Means of Producing Electricity, and on a Curious Action of a Jet of Steam upon a Ball", No. 142, January, 1843, pp 1–5.
6. *The Encyclopedia of Physics*, "Potential" edited by Besancon, R. M., Reinhold Publishing Corp., New York, 1966, pp 550–551.
7. List of Contracts with the Department of the Navy.
   7.1 Bureau of Naval Weapons, Contract No. 60-0831-c with Marks Polarized Corporation—Final Report—July 1960—December 1961.
   7.2 Bureau of Naval Weapons, Contract NOW 62-0644-c with Marks Polarized Corporation—Final Report—February—August 1962.
   7.3 Bureau of Naval Weapons, Contract NOW 63-0225-c with Marks Polarized Corporation—Final Report—September 1962—July 1963.
   7.4 Bureau of Naval Weapons, Department of the Navy, Contract No. 66-0582-c—Final Report—April 1967—August 1967.
   7.5 Department of the Navy Contract No. 00019068C-0408 with Marks Polarized Corporation.
8. Joshi, K. K., "Electrical Charging of Liquid Sprays in High Pressure Gas Flows for Electrofluiddynamic Pressures", IEEE Trans. on Electron Devices, February, 1969, pp 227–231.
9. Melcher, J. R. and Sachar, K. S., "Charged Droplet Technology for Removal of Particulates from Industrial Gases", Final Report under Task No. 8, Contract No. 68-002-0018, Aug. 1, 1971, to Environmental Protection Agency.
10. Blanchard, D.C., "Electrically Charged Drops from Bubbles in Sea Water and Their Meterological Significance", *J. of Meteorology*, Vol. 15, August 1958 pp 383–386.
11. Lenard, P., "ueber die Electricitat der Wasserfalle", *Wied, Ann.*, XIVI, 1892, p. 584.
12. Aselmann, E., "Uber Elektrizitatstrager, die durch fallenden Flussigkeitenerzeugt werden", *Ann. d. Phys.*, XIX, 1906, p 960.

Having thus fully described my invention, what I wish to claim is:

1. A charged aerosol generator and a load combination, comprising a charged liquid droplet emitter means, a gas stream, a grounded collector electrode at a distance from said emitter means, a load, said load being connected between said emitter means and said collector electrode, the said emitter means producing charged droplets which have a ratio of radius to number of electron charges of at least 100 Å per electron charge, said gas stream flowing around said emitter means and receiving said charged droplets whereby the heat/kinetic power of said gas stream is transduced to electric power at said load.

2. A combination according to claim 1 in which said gas stream is a wind stream.

3. A combination according to claim 1 wherein said collector electrode comprises the entire earth's surface.

4. A combination according to claim 1, wherein said collector electrode is a duct.

5. A combination according to claim 1 wherein said emitter means produces charged liquid droplets by the condensation of a vapor onto ions.

6. A combination according to claim 1 wherein said emitter means produces charged liquid droplets by an electrojet.

7. A combination according to claim 1 wherein said emitter means produces charged liquid droplets by the condensation of a steam jet onto ions.

8. A combination according to claim 1, wherein said emitter means produces charged liquid droplets by electrojet mixture condensation.

9. A combination according to claim 1 wherein said emitter means produces charged liquid droplets by the condensation of steam in contact with a metal.

10. A combination according to claim 1 wherein said emitter means produces charged liquid droplets by liquid/metal contact.

11. A combination according to claim 1, wherein means are provided for converting DC to AC power at said load comprising a resistor, a step-down transformer having a center tapped primary coil and a secondary coil, a switching device, said grounded collector being alternately connected to the ends of said primary coil via said switching device, the center tap of said primary coil being connected to said emitter means, said secondary coil supplying alternating low voltage, high current to said resistor.

12. A combination according to claim 1, in which said charged aerosol emitter has a Figure of Merit exceeding 100 $\mu$A/watt.

13. A combination according to claim 1 wherein said emitter means is a liquid/metal contact type, comprising: an enclosure, means for supplying a liquid under pressure to said enclosure, an orifice in said enclosure, a conductive material at said orifice in contact with said liquid, whereby said liquid is charged by contact with said conductive material and issues from said orifice as a charged droplet.

14. A combination according to claim 1, wherein said emitter means is a condensation type, comprising: a source of superheated vapor, a conductive point, a nozzle having an orifice, a conductor at said orifice, said source of superheated vapor being supplied to said nozzle and issuing as a vapor jet from said orifice into said gas stream, said point being located in said vapor jet, a source of electric potential difference, said electric potential difference being applied between the said conductor at said orifice and said point, said vapor in said jet condensing on ions from the said conductive point to form singly charged liquid droplets.

15. A combination according to claim 1, wherein said emitter means is a vapor/metal contact type, comprising: an enclosure, a means for supplying superheated vapor under pressure to said enclosure, an orifice in said enclosure, said enclosure receiving and cooling said vapor, a conductor in said enclosure for charging said vapor, whereby charged droplets are formed by condensation and contact of the said vapor on said conductor and issue from said orifice into said gas stream.

16. A combination according to claim 4 wherein said emitter means is a compressed free air electrojet.

17. A combination according to claim 1, wherein said emitter means is an induction type comprising: an enclosure, means for supplying a liquid under pressure to said enclosure, an orifice in said enclosure, a conductor in contact with said liquid at said orifice, an exciter electrode in said gas stream, a voltage source of electric potential difference, and voltage source being connected to said exciter electrode and to said conductor, said pressure causing a liquid jet to issue from said orifice, said electrical potential difference being applied between said liquid jet and said exciter electrode, said jet being electrically charged by induction and broken into charged liquid droplets.

18. A combination according to claim 1, wherein said emitter means produces charged droplets by the separation of ions within an ionizable liquid.

19. A combination according to claim 10, wherein said emitter means contains an ionizable liquid which is water.

20. A combination according to claim 10, wherein said emitter means contains a liquid which is a liquid metal.

21. A combination according to claim 15, wherein said supplying means comprises a flash boiler in a portion of said enclosure.

22. A combination according to claim 15 wherein the vapor is superheated steam.

23. A combination according to claim 15 wherein said vapor is a superheated metal vapor.

24. A combination according to claim 15 wherein the superheated vapor is supplied by an external boiler and superheater.

25. In a charged aerosol wind/electric power generator, a charged liquid droplet emitter means for forming a charged aerosol, a gas stream having a velocity vector, a load, a collector electrode at ground potential at a distance from said emitter means for discharging charged liquid droplets, the load being connected between said emitter means and said collector electrode, said emitter means operating to inject said charged liquid droplets into said gas stream, said charged liquid droplets having a ratio of radius to number of electron charges of at least 100 A per electron charge, a space charge potential well produced by said charged aerosol, said emitter means being situated in said potential well, whereby said gas stream does work in moving said charged liquid droplets from said emitter means to discharge at said collector electrode, said collector electrode including a surface approximately parallel to said gas stream velocity vector, thereby completing a circuit from said collector through the said load to said emitter means, whereby heat/kinetic power from said gas stream is converted to electric power at said load.

26. An induction type charged aerosol emitter means for injecting charged droplets into a gas stream, comprising: an enclosure, means for supplying an ionizable liquid under pressure to said enclosure, an orifice and a conductor in said enclosure, said liquid issuing as a jet from said orifice, an exciter electrode within said enclosure in the vicinity of said orifice, said conductor being in contact with said liquid at said orifice, a voltage source of electric potential difference, said voltage source being connected to said exciter electrode and to said conductor, said potential difference causing said ionizable liquid to be separated into positive and negative ions, said ions of one polarity being discharged at said conductor, and said ions of the other polarity being carried by said jet which breaks into charged droplets in said gas stream.

27. A compressed free air induction type electrojet charged droplet emitter in a wind stream, comprising: an enclosure, an orifice in said enclosure, a conductor at said orifice, a liquid in said enclosure, means for supplying said liquid under pressure to said enclosure so that said liquid issues from said orifice as a jet into said wind stream, an air foil in said wind stream in the vicinity of said jet, said jet being in contact with said conductor, an exciter electrode in said wind stream spaced from said jet, a voltage source of electric potential difference, said voltage source being connected to said conductor and to said exciter electrode, said voltage source applying an electric potential difference between said jet and said exciter electrode, said jet being accelerated by said wind stream and electrically charged by induction whereby said jet is broken into charged liquid droplets in said wind stream.

28. An induction type charged droplet emitter in a gas stream, comprising: an enclosure, an orifice in said enclosure, a conductor at said orifice, a liquid in said enclosure, means for supplying said liquid under pressure to said enclosure so that said liquid issues as a jet from said orifice, said jet being in contact with said conductor, an exciter electrode in said gas stream spaced from said jet, a voltage source, said voltage source being connected to said conductor and to said exciter electrode, said voltage source applying an electric potential difference between said jet and said exciter electrode, said jet being electrically charged by induction, whereby said jet is broken into charged liquid droplets in said gas stream.

29. A method of transducing wind power to electric power comprising the steps of producing charged liquid droplets from an emitter having a ratio of radius to number of electron charges of at least 100 Å per electron charge, introducing said charged liquid droplets into a wind stream, discharging said droplets at a spaced grounded collector electrode, and returning said charges through a load connected between said grounded collector electrode and said emitter, thereby providing electric power to said load.

* * * * *